(12) United States Patent
Apland

(10) Patent No.: US 10,773,561 B2
(45) Date of Patent: Sep. 15, 2020

(54) HITCH ASSEMBLY

(71) Applicant: Daniel E. Apland, Chester, SD (US)

(72) Inventor: Daniel E. Apland, Chester, SD (US)

( * ) Notice: Subject to any disclaimer, the term of this patent is extended or adjusted under 35 U.S.C. 154(b) by 197 days.

(21) Appl. No.: 16/026,788

(22) Filed: Jul. 3, 2018

(65) Prior Publication Data

US 2020/0009930 A1    Jan. 9, 2020

(51) Int. Cl.
| *B60D 1/46* | (2006.01) |
| *B60D 1/06* | (2006.01) |
| *B60D 1/52* | (2006.01) |
| *B60P 3/10* | (2006.01) |

(52) U.S. Cl.
CPC ............... *B60D 1/46* (2013.01); *B60D 1/06* (2013.01); *B60D 1/52* (2013.01); *B60P 3/1033* (2013.01)

(58) Field of Classification Search
CPC .... B60D 1/46; B60D 1/06; B60D 1/52; B60P 3/1033
See application file for complete search history.

(56) References Cited

U.S. PATENT DOCUMENTS

| 5,975,553 | A | | 11/1999 | Van Vleet | |
| 6,145,813 | A | * | 11/2000 | Anderson | B60S 9/08 |
| | | | | | 254/418 |
| 6,213,491 | B1 | * | 4/2001 | Southard, Jr. | B60D 1/66 |
| | | | | | 254/420 |
| 6,575,488 | B2 | | 6/2003 | Massey | |
| 6,612,615 | B1 | * | 9/2003 | Dimand | B60R 9/06 |
| | | | | | 224/531 |
| 7,219,915 | B2 | * | 5/2007 | Christensen | B60D 1/46 |
| | | | | | 280/490.1 |
| 7,370,844 | B2 | | 5/2008 | McGriff | |
| 7,451,996 | B2 | | 11/2008 | Miles | |
| 7,527,280 | B1 | | 5/2009 | Zachmeier | |
| 8,162,290 | B1 | * | 4/2012 | Tracy | B66F 1/06 |
| | | | | | 254/133 R |
| 9,381,782 | B2 | * | 7/2016 | Schwennsen | B60D 1/52 |
| 10,065,566 | B1 | * | 9/2018 | Harbaugh | B60D 1/46 |
| 2012/0006572 | A1 | | 1/2012 | Adams | |
| 2015/0050107 | A1 | | 2/2015 | Kipp | |
| 2015/0197125 | A1 | | 7/2015 | Kemper | |

\* cited by examiner

*Primary Examiner* — Ruth Ilan
*Assistant Examiner* — Marlon A Arce

(57) ABSTRACT

A hitch assembly includes a support extendable into a receiver tube attached to a vehicle. A sleeve has a top end and a bottom end. A bracket is attached to the sleeve and is attached to the support to vertically orientate the sleeve. A piston is positioned in the sleeve and extends outwardly of the bottom end. The piston has a lower end that is moveable toward or away from the bottom end. An actuator is mounted on the sleeve and is mechanically coupled to the piston. The actuator is actuated in a first direction to lower the lower end and actuated in a second direction to raise the lower end. A ball mount is removably attached to the piston adjacent to the lower end. A hitch ball is attached to the ball mount and engages a hitch coupler of a trailer.

4 Claims, 6 Drawing Sheets

HITCH ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to hitch devices and more particularly pertains to a new hitch device for lowering a front end of a trailer such that a boat positioned thereon will clear a doorway of a garage as the trailer is moved therein.

BRIEF SUMMARY OF THE INVENTION

An embodiment of the disclosure meets the needs presented above by generally comprising a support to be extended into and removably coupled to a receiver tube attached to a vehicle. A sleeve has a top end and a bottom end. A bracket is attached to the sleeve and is releasably engageable with the support such that the sleeve is vertically orientated. A piston is positioned in the sleeve and extends outwardly of the bottom end. The piston has a lower end that is moveable toward or away from the bottom end. An actuator is mounted on the sleeve and is mechanically coupled to the piston. The actuator is actuated in a first direction to lower the lower end relative to the bottom end and actuated in a second direction to raise the lower end relative to the bottom end. A ball mount is removably attached to the piston adjacent to the lower end. A hitch ball is attached to the ball mount and engages a hitch coupler of a trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
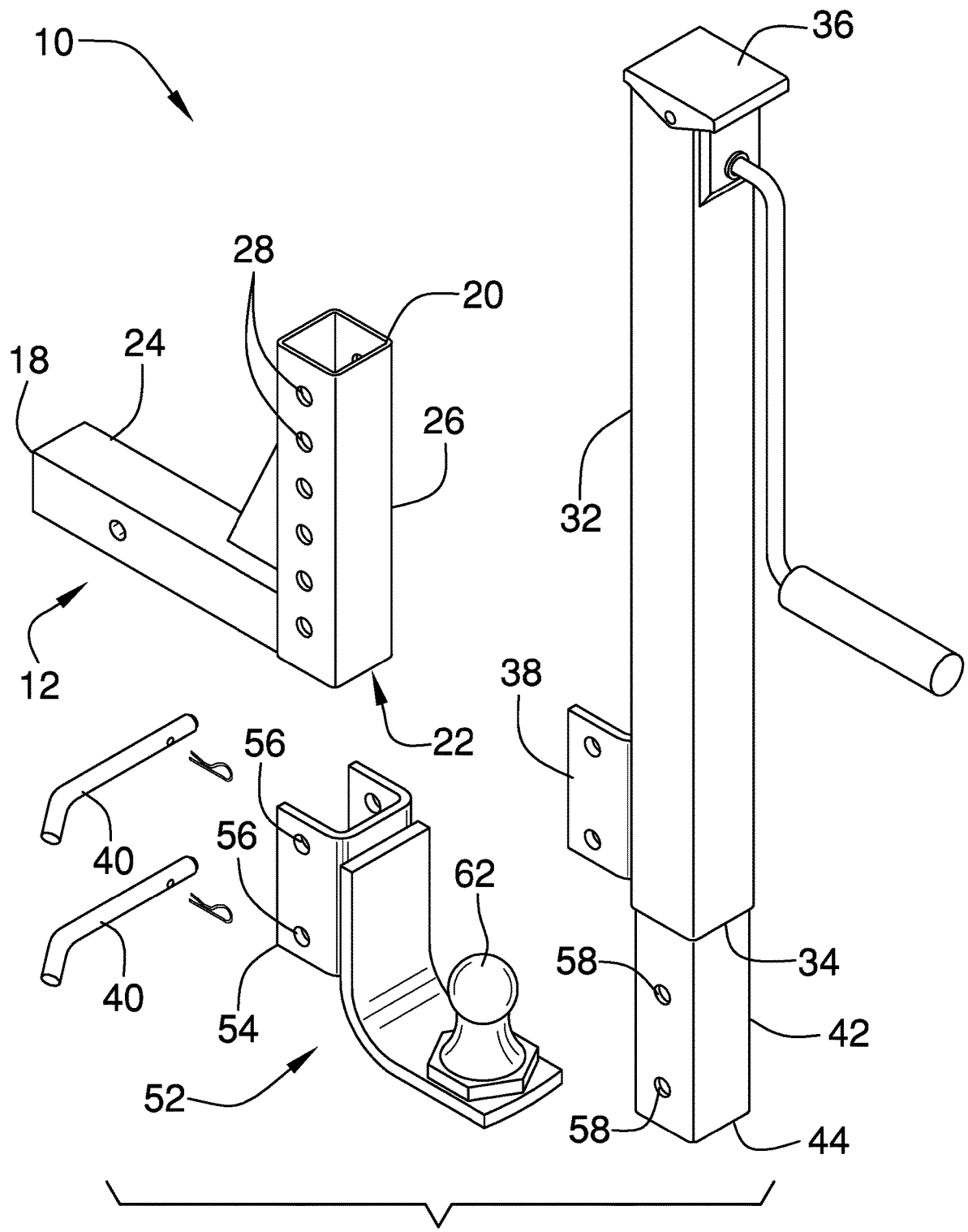
FIG. 1 is a rear perspective exploded view of a hitch assembly according to an embodiment of the disclosure.
Figure 2:
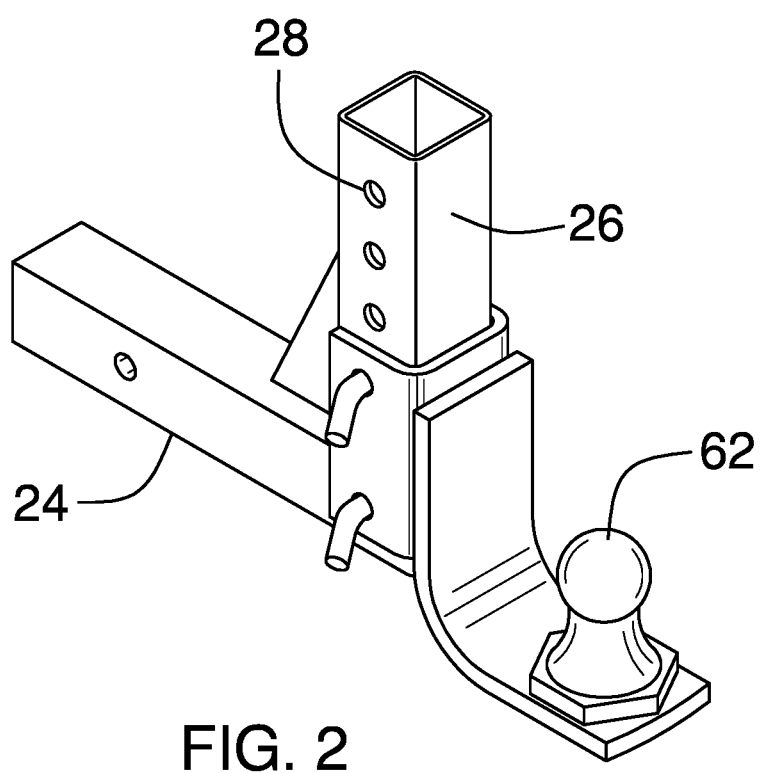
FIG. 2 is a rear perspective view a hitch ball of an embodiment of the disclosure.
Figure 3:
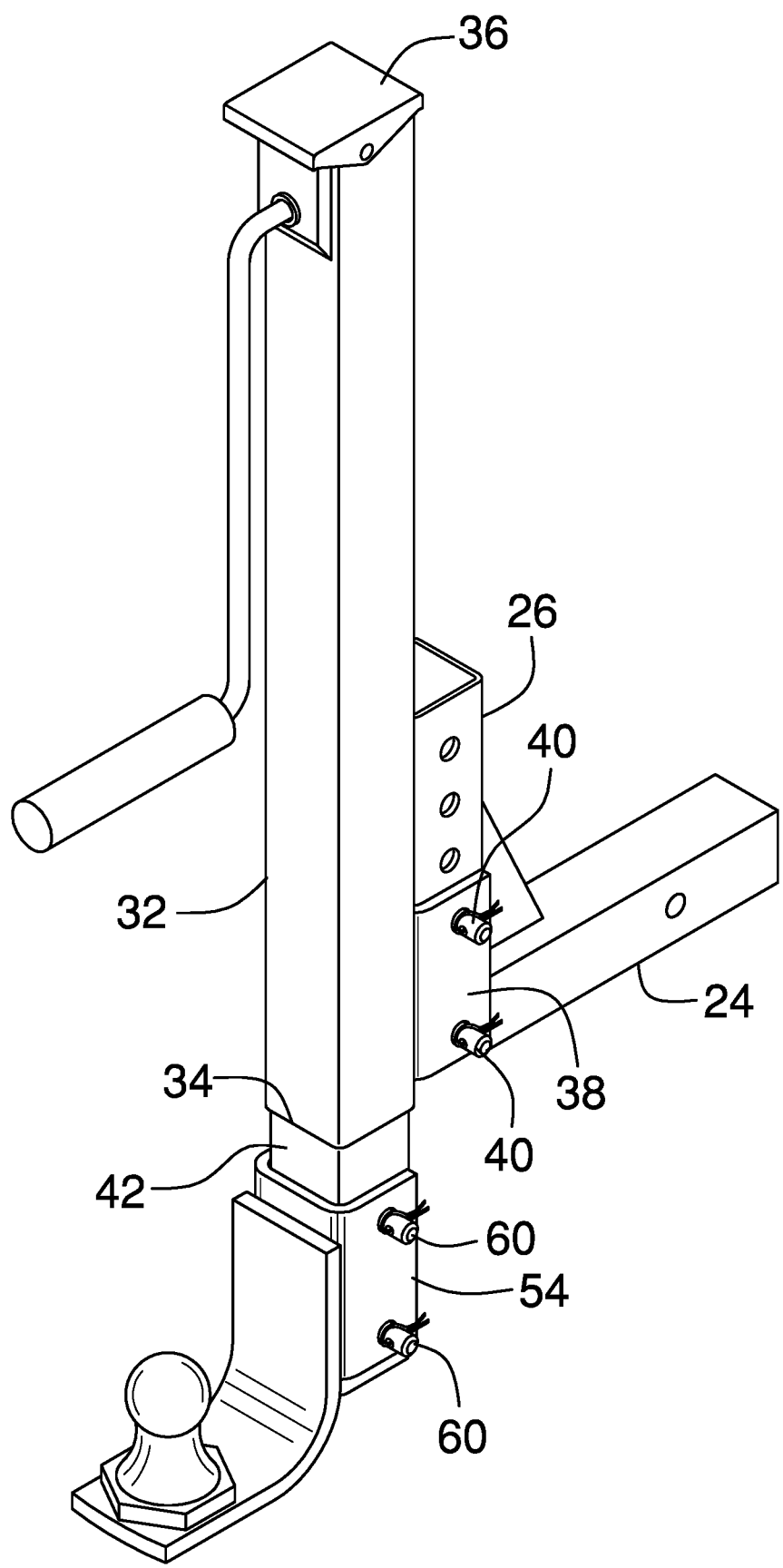
FIG. 3 is a rear perspective view of an embodiment of the disclosure.
Figure 4:
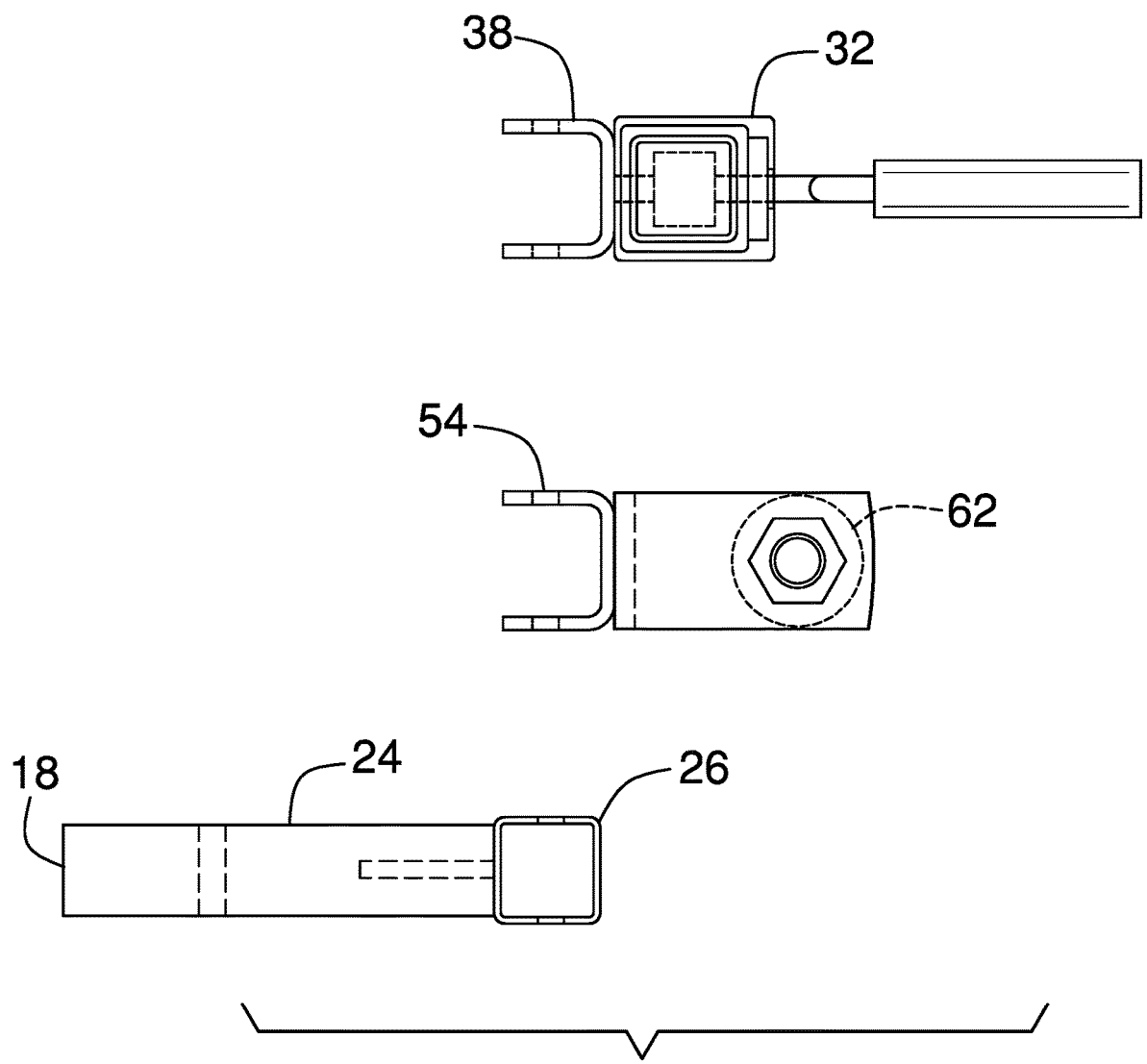
FIG. 4 is a bottom exploded view of an embodiment of the disclosure.
Figure 5:
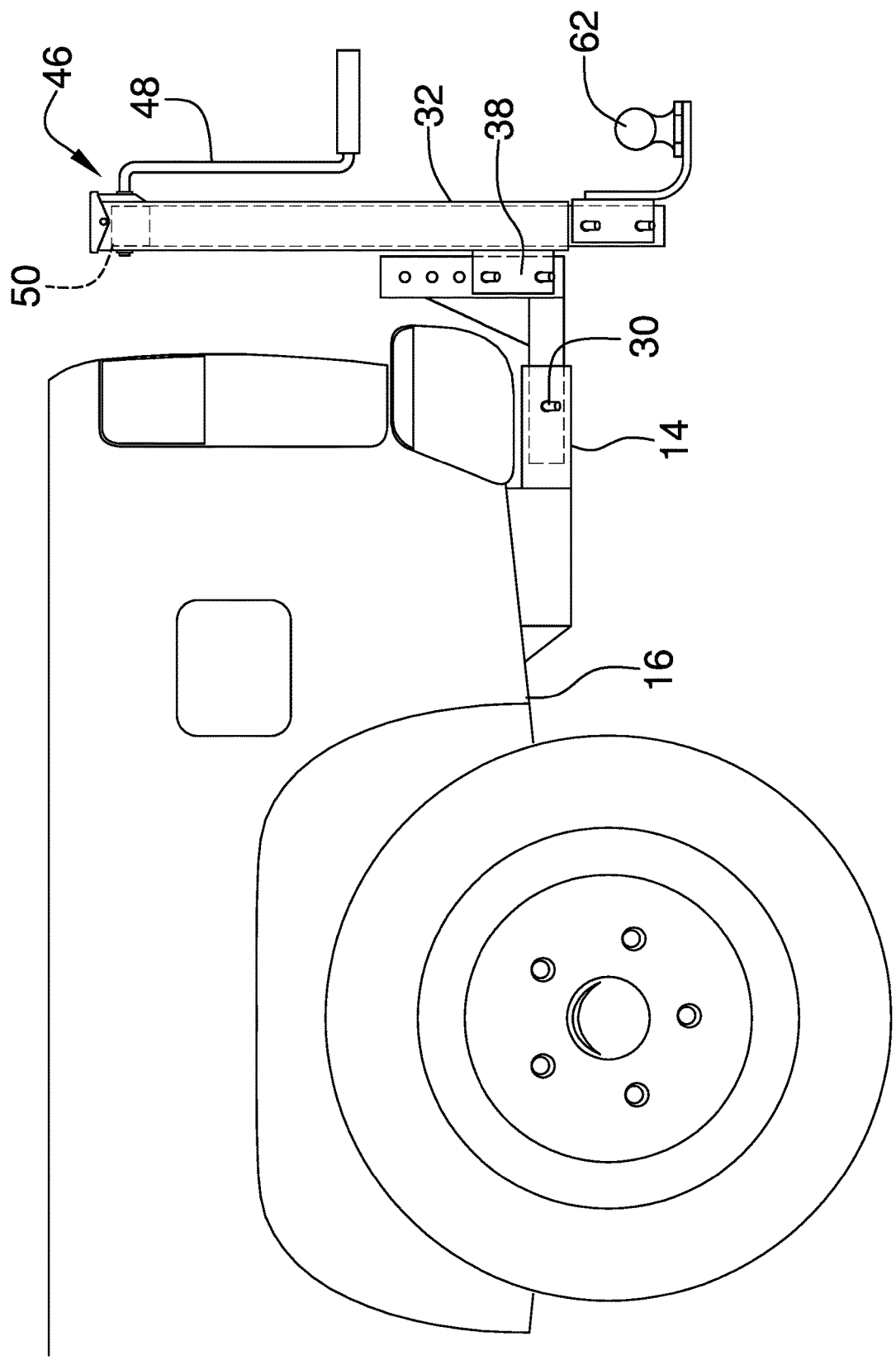
FIG. 5 is a side view of an embodiment of the disclosure.
Figure 6:
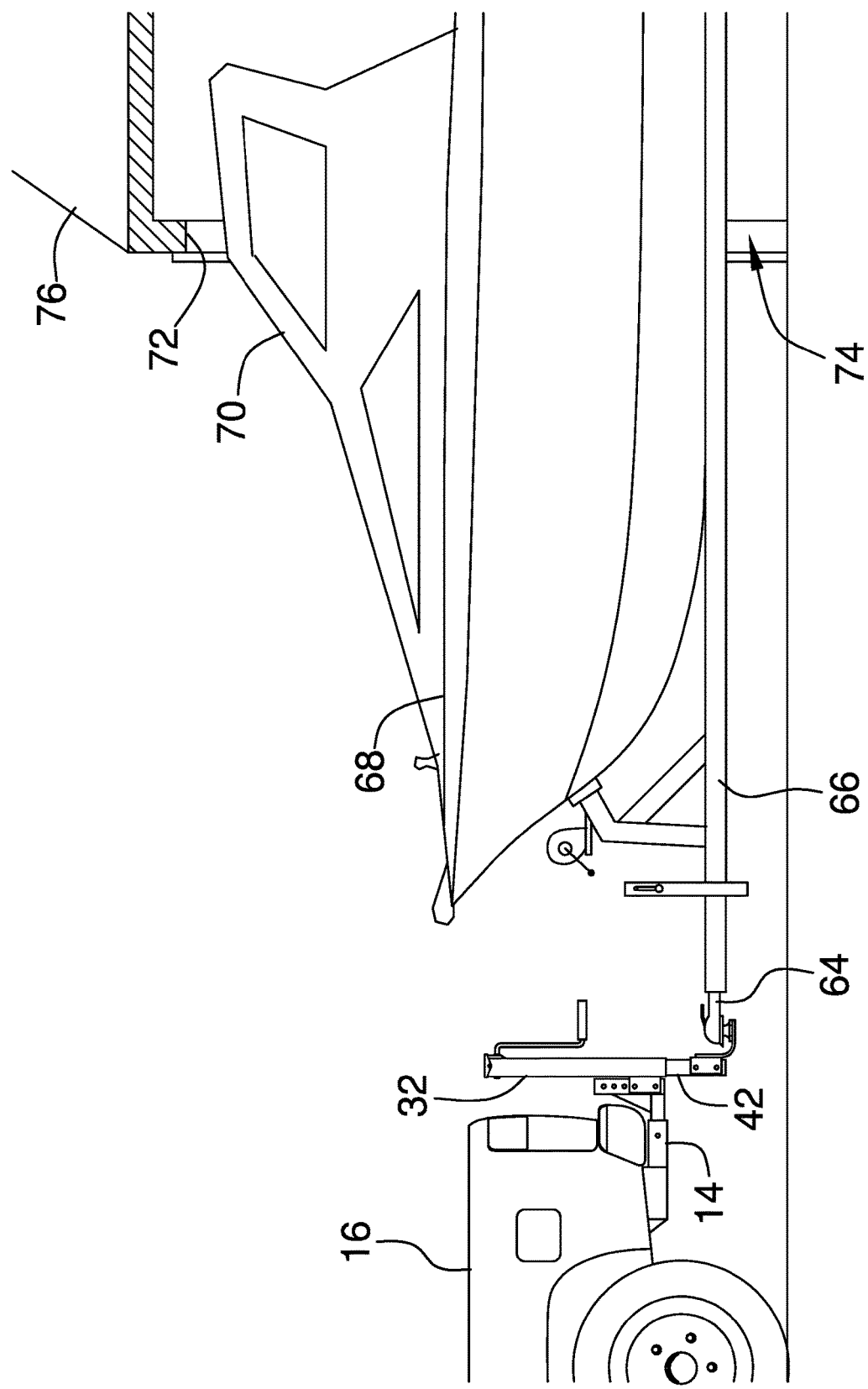
FIG. 6 is a side in-use view of an embodiment of the disclosure.

With reference now to the drawings, and in particular to FIGS. 1 through 6 thereof, a new hitch device embodying the principles and concepts of an embodiment of the disclosure and generally designated by the reference numeral 10 will be described.

As best illustrated in FIGS. 1 through 6, the hitch assembly 10 generally comprises a support 12 that is configured to be extended into and removably coupled to a conventional receiver tube 14 attached to a vehicle 16. The support 12 has a first end 18 and a second 20. The second end 20 extends outwardly of the receiver tube 14 when the first end 18 is positioned within the receiver tube 14. The support 12 has a bend 22 therein positioned between the first 18 and second 20 ends to define a foot portion 24 extendable into the receiver tube 14 and a leg portion 26 extending upwardly from the foot portion 24. The leg portion 26 includes a plurality of holes 28 therein that are vertically aligned with each other. The foot 24 and leg 26 portions are orientated perpendicular to each other. A conventional fastener 30 may be extended through the receiver tube 14 and the foot portion 24.

A sleeve 32 is provided that has a top end 36 and a bottom end 34. A bracket 38 is attached to the sleeve 32 and is releasably engageable with the support 12 such that the sleeve 32 is vertically orientated. The sleeve 32 has a height between 1.0 feet and 3.0 feet. The bracket 38 is attached to and supported on the leg portion 26. The bracket 38 receives pins 40 that extend through the holes 28 in the leg portion 26 and allows the bracket 38 to be selectively positioned nearer to the bend 22 or nearer to the second end 20 such that a distance between the bottom end 34 and the support 12 is adjustable.

A piston 42 is positioned in the sleeve 32 and extends outwardly of the bottom end 34. The piston 42 has a lower end 44 that is moveable toward or away from the bottom end 34. An actuator 46 is mounted on the sleeve 32 and is mechanically coupled to the piston 42. The actuator 46 is actuated in a first direction to lower the lower end 44 relative to the bottom end 34 and actuated in a second direction to raise the lower end 44 relative to the bottom end 34. The actuator 46 may, for example, comprise a handle 48 coupled to a conventional screw drive 50 that is mechanically coupled to the piston 42 wherein the piston 42 is lowered or raised depending on the direction of rotation of the handle 48 and corresponding screw drive 50. However, any piston 42 lowering and raising mechanism may be utilized including electric motors, chain driven systems, pneumatic actuators and the like.

A ball mount 52 is removably attached to the piston 42 adjacent to the lower end 44. The ball mount 52 includes a connector 54 having openings 56 therein that are alignable with apertures 58 in the piston 42. A pin 60 is extendable through aligned ones of openings 56 and apertures 58 to secure the ball mount 52 to the piston 42. A hitch ball 62 is attached to the ball mount 52 and is configured to engage a hitch coupler 64 of a trailer 66. As can be readily understood from the Figures, the ball mount 52 may be attached directly to the leg portion 26 if desired by aligning the openings 56 with the holes 28.

In use, the assembly 10 is typically used where a person requires additional clearance between the top of an object on a trailer 66 and the head 72 of a garage or storage space door opening. More specifically, a windshield 70 of a boat 68 may require additional clearance and therefore it is advantageous to be able lower the front end of the trailer 66 to also lower the upper edge of the windshield 70 as the trailer 66 is moved into a garage. Generally, the trailer 66 is backed at least partially into the garage 76 and then removed from its standard ball hitch which is replaced with the support 12 and sleeve 32. The ball mount 52 is then coupled to the piston 42 and the trailer 66 attached to the hitch ball 62. The piston 42 is lowered as needed and so that the windshield 70 will clear the opening 74 and then the trailer 66 is further backed into the garage 76.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch assembly configured to engage a front end of a trailer to lower or raise the front end, the hitch assembly comprising:
    a support configured to be extended into and removably coupled to a receiver tube attached to a vehicle;
    a sleeve having a top end and a bottom end;
    a bracket being attached to the sleeve, the bracket being releasably engageable with the support such that the sleeve is vertically orientated;
    a piston being positioned in the sleeve and extending outwardly of the bottom end, the piston having a lower end being moveable toward or away from the bottom end;
    an actuator being mounted on the sleeve and being mechanically coupled to the piston, the actuator being actuated in a first direction to lower the lower end relative to the bottom end and actuated in a second direction to raise the lower end relative to the bottom end;
    a ball mount being removably attached to the piston adjacent to the lower end, the ball mount including a connector having openings therein being alignable with apertures in the piston, a pin being extendable through aligned ones of openings and apertures to secure the ball mount to the piston; and
    a hitch ball being attached to the ball mount and being configured to engage a hitch coupler of the trailer.

2. The hitch assembly according to claim 1, wherein the support has a first end and a second end, the second end extending outwardly of the receiver tube when the first end is positioned within the receiver tube, the support having a bend therein positioned between the first and second ends to define a foot portion extendable into the receiver tube and a leg portion extending upwardly from the foot portion, the foot and leg portions being orientated perpendicular to each other, the bracket being supported on the leg portion.

3. The hitch assembly according to claim 2, further comprising a distance between the bottom end and the support being adjustable.

4. A hitch assembly configured to engage a front end of a trailer to lower or raise the front end, the hitch assembly comprising:
    a support configured to be extended into and removably coupled to a receiver tube attached to a vehicle, the support having a first end and a second end, the second end extending outwardly of the receiver tube when the first end is positioned within the receiver tube, the support having a bend therein positioned between the first and second ends to define a foot portion extendable into the receiver tube and a leg portion extending upwardly from the foot portion, the foot and leg portions being orientated perpendicular to each other;
    a sleeve having a top end and a bottom end;
    a bracket being attached to the sleeve, the bracket being releasably engageable with the support such that the sleeve is vertically orientated, the bracket being supported on the leg portion, the bracket being selectively positioned nearer to the bend or nearer to the second end such that a distance between the bottom end and the support is adjustable;
    a piston being positioned in the sleeve and extending outwardly of the bottom end, the piston having a lower end being moveable toward or away from the bottom end;
    an actuator being mounted on the sleeve and being mechanically coupled to the piston, the actuator being actuated in a first direction to lower the lower end relative to the bottom end and actuated in a second direction to raise the lower end relative to the bottom end;
    a ball mount being removably attached to the piston adjacent to the lower end, the ball mount including a connector having openings therein being alignable with apertures in the piston, a pin being extendable through aligned ones of openings and apertures to secure the ball mount to the piston; and a hitch ball being attached to the ball mount and being configured to engage a hitch coupler of the trailer.

\* \* \* \* \*